United States Patent
Taal et al.

(10) Patent No.: US 6,818,093 B1
(45) Date of Patent: Nov. 16, 2004

(54) HOT-MELT ADHESIVE OF LOW VISCOSITY

(75) Inventors: Eduard Franciscus Taal, Duesseldorf (DE); Ruediger Voss, Duesseldorf (DE); Heike Eisfeld, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/958,641

(22) PCT Filed: Apr. 4, 2000

(86) PCT No.: PCT/EP00/02966

§ 371 (c)(1),
(2), (4) Date: Jan. 29, 2002

(87) PCT Pub. No.: WO00/61695

PCT Pub. Date: Oct. 19, 2000

(30) Foreign Application Priority Data

Apr. 13, 1999 (DE) .......................... 199 16 503

(51) Int. Cl.⁷ .................. C09J 153/02; B32B 27/32
(52) U.S. Cl. .................. 156/327; 156/334; 428/355 BL
(58) Field of Search ................. 156/327, 334; 428/355 BL; 524/474, 499, 505; 525/92 L, 97–98

(56) References Cited

U.S. PATENT DOCUMENTS

| | | | |
|---|---|---|---|
| 4,046,838 A | | 9/1977 | Feeney ............... 525/97 |
| 4,072,735 A | * | 2/1978 | Ardemagni .......... 525/177 |
| 4,136,699 A | * | 1/1979 | Collins et al. ........ 604/387 |
| 4,169,822 A | * | 10/1979 | Kutch et al. ......... 523/450 |
| 4,210,570 A | | 7/1980 | Trotter et al. ........ 524/271 |
| 4,361,672 A | * | 11/1982 | Agarwal et al. ...... 525/54.5 |
| 4,394,915 A | * | 7/1983 | Nelson .............. 215/12.2 |
| 4,680,333 A | * | 7/1987 | Davis ............... 524/394 |
| 4,833,193 A | * | 5/1989 | Sieverding ........... 524/486 |
| 4,956,207 A | * | 9/1990 | Kauffman et al. ..... 428/34.2 |
| 5,021,257 A | | 6/1991 | Foster et al. ......... 427/2 |
| 5,095,059 A | * | 3/1992 | Kitamura et al. ..... 524/272 |
| 5,149,741 A | * | 9/1992 | Alper et al. ......... 525/95 |
| 5,459,193 A | * | 10/1995 | Anderson et al. ..... 524/505 |
| 5,559,165 A | * | 9/1996 | Paul ................. 523/111 |
| 5,869,555 A | * | 2/1999 | Simmons et al. ..... 524/229 |
| 5,912,295 A | * | 6/1999 | Oeltjen et al. ....... 524/505 |
| 5,916,959 A | * | 6/1999 | Lindquist et al. ..... 524/505 |
| 5,939,483 A | * | 8/1999 | Kueppers ........... 524/487 |
| 6,008,148 A | * | 12/1999 | Harris et al. ........ 442/381 |
| 6,114,261 A | * | 9/2000 | Strelow et al. ....... 442/153 |
| 6,180,229 B1 | * | 1/2001 | Becker et al. ....... 428/355 BL |
| 6,184,285 B1 | * | 2/2001 | Hatfield et al. ...... 524/505 |
| 6,197,845 B1 | * | 3/2001 | Janssen et al. ....... 523/111 |

FOREIGN PATENT DOCUMENTS

| | | |
|---|---|---|
| DE | 34 28 917 | 2/1986 |
| EP | 0 442 045 | 8/1991 |
| WO | WO96/07385 | 3/1996 |
| WO | WO96/16682 | 6/1996 |
| WO | WO97/15636 | 5/1997 |
| WO | WO00/17286 | 3/2000 |

OTHER PUBLICATIONS

Degussa–Huls, Klebstoff fur Hot–Melt Anwendungen, Creanova Coating Raw Materials, D–45764 Marl, Vestoplast, pp. 3–35.

* cited by examiner

Primary Examiner—Peter Szekely
(74) Attorney, Agent, or Firm—Stephen D. Harper; Glenn E. J. Murphy

(57) ABSTRACT

The invention relates to a low-viscosity hotmelt adhesive containing A) at least one hydrocarbon resin solid at 20° C. with a softening temperature of 70 to 140° C., B) at least one oil with an average molecular weight of >500 and preferably C) a styrene block copolymer. The new hotmelt adhesive is distinguished by a melt viscosity of essentially only 500 to 3200 mPas at 150° C. for a softening temperature of 60 to 115° C. It is preferably used in the field of hygiene for bonding films, nonwovens and/or shaped articles of cellulose derivatives, being distinguished by particular resistance to dermatologically compatible coatings.

12 Claims, No Drawings

HOT-MELT ADHESIVE OF LOW VISCOSITY

CROSS-REFERENCE TO RELATED APPLICATIONS

This application is a U.S. National Stage application filed under 35 U.S.C. § 371 of International Application No. PCT/EP00/02966, filed Apr. 4, 2000, in the European Patent Office, claiming priority under 35 U.S.C. §§ 119 and 365 of PCT/EP00/02966 and DE 199 16 503.3, filed on Apr. 13, 1999, in the German Patent Office.

This invention relates to a low-viscosity hotmelt adhesive based on at least one hydrocarbon resin solid at 20° C. and at least one oil. The invention also relates to the production of this hotmelt adhesive and to its use.

One such hotmelt adhesive is already known. Thus, EP 0 442 045 B1 describes a sprayable hotmelt adhesive based on a poly-α-olefin with no more than 30% by weight of additives, more particularly waxes and/or resins. Paraffinic or aromatic oils may also be used. The Examples contain ethene/propene/1-butene terpolymers and plastic microwaxes and, in some cases, also a hydrocarbon resin. The viscosities are 2700 and 3400 mPas at 190° C.

A number of atactic poly-α-olefin copolymers and terpolymers of the monomers ethylene, propylene and 1-butene are described in the technical information pamphlet entitled "Vestoplast: Klebrohstoff für Hot-Melt-Anwendungen" published by the Hüls company in 1996. Polymers such as these show excellent wetting behavior on non-polar substrates such as, for example, polyethylene and polypropylene. An increase in adhesive strength can be obtained by combination with tackifying resins or plasticizers. Substantially saturated hydrocarbon resins in particular are recommended as resins. Added in a quantity of up to 30%, the resin acts as a plasticizer. Beyond 35%, the mixture assumes the properties of the resin and becomes hard and brittle. In the case of a mixture of poly-α-olefin and resin in a ratio of 70 to 30 parts by weight, tensile strength decreases by at least 20% when the ratio is altered to 50:50 parts by weight at the expense of the poly-α-olefin. The object of adding resins is inter alia to "fine-tune" the viscosity and to reduce stringing. In most cases, polybutenes of relatively low molecular weight are recommended as plasticizers. It is less expensive to use paraffinic or naphthenic mineral oils. The basic formulation for sprayable hotmelt adhesives for sanitary articles contains 70 parts of Vestoplast 704 (a poly-α-olefin), 25 parts of Escorez 5380 (a hydrogenated polycyclopentadiene), 5 parts of Napvis D 10 (a polybutene liquid at room temperature) and 0.4 part of Irganox 1010 (an antioxidant for polyolefins). This known sprayable hotmelt adhesive has a melt viscosity of 2000 mPas at 190° C. and a softening point of 91° C.

Hotmelt adhesives for structural or elastic bonding based on ca. 50 to 60% by weight of hydrocarbon resins, ca. 20 to 30% by weight of styrene block copolymers and ca. 20% of paraffinic or naphthenic mineral oils are also available on the market.

One feature common to these hotmelt adhesives is a relatively high melt viscosity of more than 3300 mPas at 150° C. and a reduction in the adhesion values during storage at body temperature where laminates produced with them contain dermatologically compatible coatings.

These problems arise above all where the sprayable hotmelt adhesives are used for the production of a laminate of at least one nonwoven and/or at least one film. By this is also meant a shaped article which consists of a film and a central layer of cellulose pulp and which is covered by a spun bonded or carded nonwoven. Laminates such as these, which are used in particular in the field of personal hygiene, are generally materials with a limited useful life which are discarded, for example, after being used only once (disposable products). Such products include above all diapers, sanitary napkins or panty liners, etc., of which the function is to absorb bodily fluids such as, for example, urine and blood. These functions have to be performed even after storage at elevated temperature in the presence of dermatologically compatible coatings of the top sheet without the laminate disintegrating into its constituents even under the slightest mechanical stressing.

Accordingly, the problem addressed by the present invention was to improve the adhesion of laminates of nonwovens and/or films to a dermatologically compatible coating of the top sheet after storage at room temperature and at elevated temperature and also to make the hotmelt adhesive easier to process. This includes in particular reducing the melt viscosity of the hotmelt at the application temperature without causing a significant reduction in its softening point.

DESCRIPTION OF THE INVENTION

The solution provided by the invention is defined in the claims and consists essentially in the composition of the low-viscosity hotmelt adhesive. Thus, the hotmelt adhesive contains A) 20 to 70% by weight, more particularly 45 to 65% by weight of at least one hydrocarbon resin with a softening temperature of 70 to 140° C., more particularly in the range from 80 to 120° C. (component A), B) 5 to 50% by weight, more particularly 5 to 25% by weight of at least one oil—preferably of a saturated hydrocarbon liquid at 20° C.—with an average molecular weight $MG_w$ of more than 500, more particularly more than 900 (component B), C) 0 to 50% by weight, preferably 5 to 30% by weight of at least one thermoplastic elastomer, more particularly a styrene block copolymer and, above all, of the SIS, SBS and SEBS type (component C) and D) optionally additives such as heat and light stabilizers, optical brighteners, antistatic agents, lubricants and antiblocking agents, nucleating agents, dyes, pigments and flame retardants.

The hotmelt adhesive has a viscosity of 500 to 9000 mPas, more particularly in the range from 700 to 3200 mPas and above all in the range from 1000 to 2500 mPas (Brookfield model RVT DV II, 150° C., spindle 27; to ASTM D 3236-88) and a softening temperature (R+B) of 60 to 115° C. and more particularly in the range from 90 to 100° C.

Component A contains above all a substantially hydrogenated and, in particular, completely hydrogenated polycyclopentadiene resin and a completely or partly hydrogenated aromatically modified resin as the hydrocarbon resin. However, other partly or completely hydrogenated aliphatic and aromatic hydrocarbon resins may also be used, including above all polyterpene resins and natural resins. Specific examples of such resins are those of the MBG® series, more particularly MBG 278 and 275; the Regalite R and S® series; the Zonarez® series; the Zonatac® series; the Betaprene® AC, AF, AL, AR, B, BC, BR series; the Betalite® series; the Eastotac® series; the ECR® series; the Escorez® series and the Wingtack® series, etc.

Component B comprises oils of preferably substantially saturated hydrocarbons liquid at 20° C., more particularly mineral oils and synthetic oils, which are approved for foods under FDA 175 105. These oils or oil mixtures have a viscosity of at least 1000 mPas, more particularly between 4000 and $8 \cdot 10^5$ mPas, as measured to ASTM D 3236-88 with spindle 27 at 40° C. These oils are used inter alia to fine-tune the viscosity. Oils of the type in question are marketed under the following names: Primol 352®, Shell-Öl 4178, Essomarcol® series, Pionier 0352®; Drakeol 35®; Kaydo®, Ondina G® series, Catenex-Öle N®, Parapol 950, Regalite R10, LVS-I 101 and Regalrez 1018. A polybutylene, a styrene block copolymer or a resin liquid at 20° C. is preferably used as the oil. Part of component B, i.e. 80% and, more particularly, 50%, based on the oil component may be replaced by oils with average molecular weights $MG_w$ of less than 500.

Component C is a thermoplastic elastomer, more particularly a block copolymer of styrene, above all of the following type: SIS, SBS, SEBS, SBR, SEPS. Raw materials such as these are marketed under the following names: Kraton series, Stereon series, Vecter series, Europrene series, Taipol series, Calprene series, Finaprene series.

Components A and B together should make up at least 25% by weight, preferably at least 50% by weight and more preferably at least 70% by weight, based on the sum of components A, B and C.

Besides these essential components, other substances may be added, including for example heat and light stabilizers, optical brighteners, antistatic agents, lubricants and antiblocking agents, nucleating agents and dyes, pigments and flame retardants.

A suitable antioxidant is, above all, Irganox 1010 in a quantity of 0 to 3% by weight, based on the hotmelt adhesive as a whole. Other stabilizers include, above all, Irganox PS 800; Irgastab DBTM, the Wingstay series; Wingstay SN-1; Evernox 10, etc.

To produce the hotmelt adhesive, the raw materials mentioned above are mixed in the melt in an inert gas atmosphere and/or in vacuo until they appear homogeneous. The temperature of the melt is preferably in the range from 150 to 200° C. It is also important to ensure that the hotmelt adhesive produced does not contain any fish eyes.

The hotmelt adhesive obtained is essentially characterized by its viscosity of 500 to 9000, preferably 700 to 3200 and above all 100 to 2500 mPas at 150° C., as measured with a Brookfield model RVT DBII; 150° C.; spindle 27, to ASTM D 3236-88. In addition, it is essentially distinguished by softening temperatures of 60 to 115° C. and more particularly 90 to 100° C., as measured to ASTM E 28.

In addition, it is characterized by its favorable sprayability, i.e. it can be atomized and also lends itself to "spin spraying". In the first of these two processes, the melt is atomized into fine melt droplets whereas, in "spin spraying", a filament of the melt leaves the spray nozzle with twist and is deposited without breaking in the form of a spiral on the substrate to be coated. The spraying technology generally provides for contactless application and for the coating of uneven irregular surfaces. It is also suitable for applications where, although surface bonding is required, the bonded surface is expected to be permeable to air or moisture. Because there is no whole-surface application, material can be saved.

The hotmelt adhesive according to the invention affords another advantage in the coating of temperature-sensitive substrates. By virtue of the contactless application and the very low heat content of the melt or melt filament applied, the substrate undergoes far less stressing or damage than in conventional application technologies. Hotmelt spraying technology is environmentally friendly and, overall, covers many applications which hitherto have been reserved for sprayed solvent-based adhesives.

In the process according to the invention, the adhesive is generally applied in a quantity of about 0.1 to about 10 g/m², preferably in a quantity of about 1 to about 6 g/m² and more preferably in a quantity of about 3 to about 5 g/m² to at least parts of one of the substrates to be bonded. However, it is preferably applied to the surface as a whole.

For application, the adhesive according to the invention is heated to a temperature of about 100 to about 180° C. The temperature of the adhesive is determined by its viscosity and by the method of application used. For example, the adhesive may even be applied through a slot die. In this case, an adhesive temperature of about 120 to about 150° C., for example, has proved to be useful. In the case of the control coat process or even the porous coat process, adhesive temperatures of about 130 to about 170° C. have proved to be useful.

By virtue in particular of its low melt viscosity, the hotmelt adhesive according to the invention is potentially suitable as a low melt adhesive, for example for bonding sensitive materials, such as films with a thickness of less than 25 μm and with a low softening temperature.

The hotmelt adhesives according to the invention are suitable for bonding various materials. Thus, such materials as polyolefin films, for example polyethylene films or polypropylene films, polyolefin nonwovens, for example polyethylene nonwovens or polypropylene nonwovens, polyurethane films, polyurethane foams, films or shaped articles of cellulose derivatives, for example tissues, films or shaped articles of polyacrylates or polymethacrylates, films or shaped articles of polyesters, more particularly polylactide, polycaprolactone, polyesteramid, and materials based on starch and cellulose, for example thermoplastic starch and viscose, can be bonded to one another. Materials of the same type and materials of different types may be bonded to one another.

In one preferred embodiment of the process according to the invention, the adhesive is used for producing a laminate containing at least one layer of nonwoven. In a particularly preferred variant, the layer of nonwoven is a polypropylene spunbonded nonwoven with a weight per unit area of about 10 to about 30 g/m² and, more particularly, about 15 to about 20 g/m².

In the context of the present invention, a "layer of nonwoven" is understood to be a flexible material which is not produced by the traditional method of warp and weft weaving or by loop formation, but rather by interlocking and/or cohesive and/or adhesive bonding of textile fibers. Accordingly, nonwovens are understood to be loose materials of spun fibers or filaments, generally made of polypropylene, polyester or viscose, which are generally held together by the adhesion inherent in the fibers. The individual fibers may be preferentially oriented (oriented or cross-layed nonwovens) or non-oriented (random-laid nonwovens). The nonwovens may be mechanically stabilized by needle punching, stitching or intermingling by sharp jets of water (spunlaced nonwovens). Adhesively stabilized nonwovens are formed by bonding the fibers with liquid binders (for example acrylate polymers, SBR/NBR, polyvinyl ester or polyurethane dispersions) or by melting or dissolving so-called binding fibers which are added to the nonwoven during its production. In cohesive stabilization, the fiber surfaces are dissolved by suitable chemicals and joined by pressure or welded at elevated temperature. Nonwovens of so-called spunbondeds, i.e. sheet-form materials produced by spinning and subsequent deposition, air-laying or floating onto a conveyor belt, are known as spunbonded nonwovens. Nonwovens containing additional filaments, woven or knitted fabrics count as reinforced nonwovens.

The hotmelt adhesives according to the invention are particularly suitable for bonding films, more particularly of polyolefins, and nonwovens, more particularly of polypropylene, and shaped articles of cellulose (core adhesive), the application temperature being between 120 and 180° C. and preferably between 140 and 160° C. and the add-on weight varying between 2 and 10 and preferably between 3 and 6 g/m² and the application rate advantageously being between 50 and 400 m/min.

The adhesives according to the invention may be used for a number of applications, for example in the building industry, in the automotive supplier industry and in the packaging industry. However, they are particularly preferred for the production of laminates, for example are particularly suitable for film/film, film/nonwoven and nonwoven/nonwoven laminates, more particularly for the production of laminates containing at least one nonwoven, above all for the production of shaped articles of a film on one side and a spunbonded or carded nonwoven on the other side with a layer of cellulose pulp in between. Such articles include, in particular, disposable articles, for example diapers, hospital textiles, sanitary napkins, bed sheets and the like, preferably in the hygiene and medical fields.

The hotmelt adhesives according to the invention are particularly suitable for structural bonding in the field of hygiene, more particularly for bonding diapers, panty liners and sanitary napkins.

The adhesives according to the invention are also suitable for this purpose by virtue inter alia of their resistance to dermatologically compatible coatings. In order to improve the skin-care properties of diapers for example, their top sheets are treated with dermatologically compatible mixtures. Diapers such as these impose particular demands on the adhesive because the adhesion values of the adhesive bond can be affected by the coatings. For example, in the case of known adhesives based on SIS rubber, a marked reduction in the adhesion values of nonwoven/film laminates was observed after ca. 4 g/m² of a dermatologically compatible coating based on a fatty alcohol had been applied. The reduction was in the range from 30 to 70% after 24 hours at room temperature and in the range from 40 to 90% after 4 hours at 40° C.

Dermatologically compatible coatings of the type in question are described, for example, in WO 96/16682, of which the relevant disclosure is expressly included as part of the present application. The coatings in question are mixtures—semisolid to solid at 20° C.—of soothing agents based on fatty acid esters, alkyl ethoxylates, ethoxylated fatty acid esters, fatty alcohols, polysiloxanes and petroleum-based products and mixtures thereof with immobilizing agents, such as polyhydroxyfatty acid esters, polyhydroxyfatty acid amides, $C_{14-22}$ fatty alcohols, $C_{14-22}$ fatty alcohol ethoxylates, $C_{14-22}$ fatty acids and paraffin waxes and mixtures thereof. Auxiliaries may optionally be present to obtain other effects, including for example hydrophilic surface-active agents, viscosity controllers, perfumes, disinfectants, film formers, etc. They should preferably have melting points in the range from ca. 36 to ca. 70° C.

The adhesive values of the adhesives according to the invention are considerably more resistant in storage to dermatologically compatible coatings such as these than known adhesives both at room temperature and at elevated temperature, for example at body temperature.

A particularly stable coating-resistant bond is obtained by using an adhesive with an average molecular weight of the oil phase of 500 to 35,000 in combination with a nonwoven finish with a dermatologically compatible coating (lotion) having an average molecular weight above 350 and, more particularly, above 500.

The invention is illustrated by the following Example.

I Starting Materials for the Production of the Hotmelt Adhesives

1) Kraton KX 605 (Shell): SIS block copolymer containing 29% styrene and 17% diblock
2) MBG 278 (Hercules): aliphatic completely hydrogenated cyclopentadiene resin (hydrocarbon resin)
3) MBG (Hercules): aliphatic, aromatically modified, partly hydrogenated hydrocarbon resin
4) LVS-I 101 (Shell): styrene/isoprene diblock copolymer containing 13% styrene
5) Regalite R 10 (Hercules): aliphatic, completely hydrogenated cyclopentadiene resin (hydrocarbon resin)
6) Regalrez 1018 (Hercules): aliphatic, completely hydrogenated cyclopentadiene resin (hydrocarbon resin)
7) Parapol 950 (Esso): polybutylene
8) Shell-Öl 4178 (Shell): naphthenic oil
9) Irganox 1010 (Ciba-Geigy): antioxidant II Production and Properties of the Hotmelt Adhesives To produce the hotmelt adhesives, the starting materials mentioned above were melted in the quantities shown in Table 1 at 160 to 170° C. in the following order: oil+antioxidant, resin and optionally thermoplastic elastomer, and stirred at 160 to 170° C. until the mixture was free from fish eyes (homogeneous). This generally took 4 to 6 hours. In addition, it is advisable to apply a vacuum and/or an inert gas atmosphere (nitrogen), particularly where styrene block copolymers are used.

The hotmelt adhesives obtained have the properties shown in Table 1.

III Bonding Tests of the Hotmelt Adhesives

The spraying tests were carried out with a Meltex CT 325 (manufacturer Meltex, Lüneburg). The spray heads used were Nordson models CF 203 and CF 205. The initials CF stand for controlled fiberization. With the CF spray heads used here, the filament of adhesive issuing from the nozzle is set in a spiral motion by controlled injections of compressed air. This provides for the controlled, surface-covering and edge-sharp application of hotmelt adhesives.

Quantity applied: 3.5 m$^{-2}$
Application rate: 100 m.min$^{-1}$
Temperature in the melting tank: 160° C.
Temperature of the spraying air: 180° C.
Adhesive temperature: 130 to 160° C.

On the basis of these parameters, laminates in which the adhesive was sprayed onto the film and the nonwoven moved in the opposite direction were produced.

The film used was a BP/PE film, i.e. a polyethylene film with a thickness of about 10 to about 50 μm and, more particularly, about 20 to about 30 μm. The nonwoven used was Corosoft Plus H, a nonwoven of polypropylene with a weight per unit area of 14 to 30 g/m² and, more particularly, 17 g.m$^{-2}$.

The hotmelt adhesive was sprayed onto the film which was then bonded to the nonwoven.

The resulting laminates were coated with 3.5 g/m² of a dermatologically compatible lotion. Lotion 1 had an average molecular weight of 1000, lotion 2 an average molecular weight of 400 and lotion 3 an average molecular weight of only 400. The adhesion tests are summarized in Table 1.

IV Results

The tests of Examples 1 and 7 according to the invention in relation to the comparison test show a distinct improvement in the adhesion values with fiber tearing after storage at 40° C. irrespective of the dermatologically compatible lotions and a distinct reduction in melt viscosity despite only a negligible reduction in the softening temperature the resistance of the adhesives to the lotion increases with increasing molecular weight of the oil phase and the lotion.

V Description of the Tests melt viscosity of the adhesives: Brookfield model RVT DV II, 150° C., spindle 27; to ASTM D 3236-88 melt viscosity of the oil phase: ditto but at 40° C.

softening point to ASTM E 28 peel strength (so-called adhesion value) to DIN 53 530 using a Zwick type 1435 tensile tester at 20° C./50% relative humidity. The 50 mm wide sample is separated at a rate of 300 mm/min. at an angle of 180°. The peel strength is expressed in N.5cm$^{-1}$. The coating of the sample was measured at the earliest after 48 h the samples were stored for 4 h at 40° C.

the molecular weight (weight average) was determined to ASTM S-841-86.

TABLE 1

|  | Comp. | E1 | E2 | E3 | E4 | E5 | E6 | E7 |
|---|---|---|---|---|---|---|---|---|
| I Components [In % by weight] | | | | | | | | |
| Kraton 605 | 21 | 11 | 11 | 11 | 11 | 11 | 11 | |
| MBG 275 | 24 | 24 | 24 | 24 | 14 | 24 | 14 | 24 |
| MBG 278 | 36 | 36 | 36 | 36 | 36 | 36 | 36 | 36 |
| LVS-1 | | 10 | 28 | | 10 | 10 | 10 | 29 |
| Regalite R 10 | | | | | 10 | | | |
| Regalrez 1018 | | | | | | 10 | 10 | 10 |
| Parapol 950 | | | | 28 | 18 | 8 | 18 | |
| Shell-Öl 4178 | 18 | 18 | | | | | | |
| Irganox 1010 | 1 | 1 | 1 | 1 | 1 | 1 | 1 | 1 |
| II Phys. data | | | | | | | | |
| η(150° C.)[mPas] | 3359 | 780 | 3155 | 1510 | 2270 | 1435 | 1137 | 1400 |
| Ring & ball [° C.] | 98.9 | 81.2 | 95.1 | 99.7 | 97.3 | 88.6 | 92 | 67.7 |
| III Adhesion values [N5 cm$^{-1}$] after storage | | | | | | | | |
| 24 h/RT without lotion | 3.7* | 3.6* | 2.2 | 2.1 | 2.7* | 3.5* | 3.1* | 4.5* |
| 24 h/RT lotion 1 | 2.8 | 3.6 | 3.6 | 2.6 | 5.3* | 3.6* | 2.5 | 3.4 |
| 24 h/RT lotion 2 | 1.5 | 3 | 4* | 1.9 | 3.4* | 3 | 1.4 | 3.5 |
| 24 h/RT lotion 3 | 1 | 2.7 | 3.5* | 1.7 | 3.3 | 0.8 | 3.1 | 1.7 |
| 4 h/40° C. without lotion | 3.9* | 4.6* | 4.2* | 2.3 | 3.6* | 5.1* | 3.4* | 3.7* |
| 4 h/40° C. lotion 1 | 2.3 | 3.8* | 3.5 | 1.6 | 4.2* | 3.5 | 3.6* | 3.7* |
| 4 h/40° C. lotion 2 | 1 | 2.1 | 2.9 | 1.3 | 3 | 2.5 | 0.9 | 4.5* |
| 4 h/40° C. lotion 3 | 1.2 | 1.9 | 2.4 | 0.9 | 1.8 | 1.6 | 2.4 | 1.1 |

*= Tearing of material or fibers

What is claimed is:

1. An article of manufacture comprising one or more substrates bonded with a hotmelt adhesive, the substrates comprising one or more polyolefin films or nonwovens finished with a dermatologically-compatible coating having an average molecular weight of more than 350, the hotmelt adhesive having a softening temperature of 60° C. to 115° C. and a viscosity of 1000 mPas to 9000 mPas at 150° C., the adhesive comprising:

A) 20 to 70% by weight of at least one hydrocarbon resin that is solid at 20° C. and has a softening temperature of 70 to 140° C.;

B) 5 to 50% by weight of at least one oil with an average molecular weight $M_w$ of greater than 500; and C) 5 to 50% by weight of at least one thermoplastic elastomer comprising a styrene block copolymer.

2. The article of manufacture of claim 1, wherein the hotmelt adhesive has a viscosity of 1000 mPas to 3200 mPas at 150° C.

3. The article of manufacture of claim 1, wherein the oil comprises one or more of a polybutylene or a styrene block copolymer or a resin that is liquid at 20° C.

4. The article of manufacture of claim 1, wherein the hydrocarbon resin comprises one or more of a hydrogenated (poly)cyclopentadiene resin or a hydrogenated aromatically modified hydrocarbon resin.

5. The article of manufacture of claim 1, wherein the hotmelt adhesive further comprises one or more additives selected from the group consisting of heat stabilizers, light stabilizers, optical brighteners, antistatic agents, lubricants, antiblocking agents, nucleating agents, dyes, pigments, and flame retardants.

6. The article of manufacture of claim 1, wherein the sum of the weights of components A and B is at least 25% by weight of the sum of the weights of components A, B, and C.

7. The article of manufacture of claim 6, wherein the sum of the weights of components A and B is at least 50% by weight of the sum of the weights of components A, B, and C.

8. The article of manufacture of claim 7, wherein the sum of the weights of components A and B is at least 70% by weight of the sum of the weights of components A, B, and C.

9. A method of bonding substrates, said substrates comprising one or more polyolefin films or nonwovens, comprising the steps of applying to one or more of said substrates the hotmelt adhesive of claim 1 at an application temperature of 120° C. to 180° C. and an application rate of 2 g/m$^2$ to 10 g/m$^2$ at 50 to 400 m/min, and bonding at least one substrate having the adhesive applied thereto to another of the substrates, wherein the polyolefin films or nonwovens are finished with a dermatologically-compatible coating having an average molecular weight of more than 350.

10. The process of claim 9, wherein the polyolefin nonwovens comprises polypropylene.

11. The process of claim 9, wherein the application temperature is 140° C. to 160° C.

12. The process of claim 9, wherein the application rate is 3 g/m$^2$ to 6 g/m$^2$ at 50 to 400 m/min.

* * * * *